US008515338B2

(12) United States Patent  
Cohen

(10) Patent No.: US 8,515,338 B2  
(45) Date of Patent: Aug. 20, 2013

(54) SYSTEMS AND METHODS FOR SYNCHRONIZED PLAYOUT OF MUSIC ON SEVERAL PERSONAL DIGITAL MUSIC PLAYERS

(75) Inventor: Harvey S. Cohen, Middletown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 775 days.

(21) Appl. No.: 12/334,367

(22) Filed: Dec. 12, 2008

(65) Prior Publication Data

US 2010/0151783 A1 Jun. 17, 2010

(51) Int. Cl.
*H04H 40/00* (2008.01)
(52) U.S. Cl.
USPC ............... 455/3.06; 455/556.1; 707/E17.044
(58) Field of Classification Search
USPC ................. 455/3.06, 344, 412.1, 414.1, 418, 455/420, 556.1; 709/203, 204, 216, 219; 707/E17.044
See application file for complete search history.

(56) References Cited

U.S. PATENT DOCUMENTS

| | | | | |
|---|---|---|---|---|
| 7,546,118 B2* | 6/2009 | Camp, Jr. | ...................... | 455/418 |
| 7,661,121 B2* | 2/2010 | Smith et al. | .................... | 725/135 |
| 7,849,131 B2* | 12/2010 | Van De Sluis | ................ | 709/203 |
| 2004/0244041 A1* | 12/2004 | Getsin et al. | ..................... | 725/89 |
| 2009/0172200 A1* | 7/2009 | Morrison et al. | ............. | 709/248 |
| 2012/0030366 A1* | 2/2012 | Collart et al. | ................ | 709/229 |

* cited by examiner

*Primary Examiner* — Ping Y Hsieh
*Assistant Examiner* — Chung-Tien Yang
(74) *Attorney, Agent, or Firm* — Hartman & Citrin LLC

(57) ABSTRACT

Devices, systems and methods are disclosed which relate to a plurality of multimedia devices operating on a common time base having the ability to synchronize playback of a multimedia sample. A user initiates a synchronized playback by sending a request to one or more multimedia devices across a network. The user selects a multimedia sample and a start time. When the request is received by other multimedia devices on the network it can be accepted or denied. If the recipient accepts, the multimedia sample can be downloaded or cached before or streamed at the time of play. Many can enjoy listening to the same multimedia sample even using headphones. This enables a group to enjoy synchronized movement without requiring a sound system other than headphones.

24 Claims, 5 Drawing Sheets

SYSTEMS AND METHODS FOR SYNCHRONIZED PLAYOUT OF MUSIC ON SEVERAL PERSONAL DIGITAL MUSIC PLAYERS

BACKGROUND OF THE INVENTION

1. Field of the Invention

The present invention relates to synchronized playback of multimedia. More specifically, the present invention relates to synchronized playback of multimedia according to a time on a network.

2. Background of the Invention

There are various settings where people want to engage in synchronized movement to music. However, in many instances, it is beneficial for the music to only be heard by the participants. These settings include social dancing at a dance party or nightclub, square dancing, marching drills, cheerleading, ice skating, aerobic exercise, etc. Many of the settings require dancing in pairs while others require synchronized moves by large groups. These settings all require several people hearing the same music or sounds at the same time.

The problem is getting the music to all of the individuals who are participating in a synchronized manner. Getting the music to arrive to each of the people at the same time can be either technically difficult, expensive, or have undesirable side effects, such as annoying the neighbors. For example, aerobics classes at the gym often require each of the class members to listen to a music mix as well as commands. This is often accomplished by playing the music through a stereo system at the gym. However, frequently there are not any kind of barriers between these aerobics classes and the rest of the gym. The music playing may interrupt or annoy other people in other parts of the gym.

There are many technical problems with getting synchronized music to a group of people. These problems include getting the music to each individual, getting the music to each individual cheaply, getting the music there without bothering people who don't want to be innocent bystanders, synchronizing the music, etc. Many attempts at this have been made, but few, if any, have succeeded.

One attempt at a solution for sending synchronized music to a group has been to blast out amplified music. The drawbacks of this method are that it is relatively expensive and it is very obtrusive to other people. If a large area outdoors needs to be covered, a high powered speaker system needs to be utilized. This system is costly and is heard by everyone, not just the group wishing to listen.

Another solution was tried during the original disco era. The solution was to give everyone a set of headphones and wire the headphones back to a distribution facility. Many discotheque parties were wired this way with everyone dancing wearing a headphone. Obviously there are problems with the management of the wires as well as distances from the distribution facility. Additionally, the equipment is relatively expensive because the system must distribute one copy of the signal to each person on the floor, requiring high power and multiple outputs.

A further attempted solution was tried once personal music players became ubiquitous with the original WALKMAN. Everyone was given a tape and put on their headphones. At the count of three everyone pressed the start button. This solution was relatively cheap, with a copy of the tape for each person as everyone already owned their WALKMAN and headphones. The problem is the synchronization. Saying "one two three go" does not give a good synchronization, particularly when trying to get razor sharp coordination of everyone's movements. This solution has been attempted further with MP3 players. MP3 players are virtually guaranteed to play the music at exactly the same speed, whereas tape players may wander off from one another. The problem that remains is getting everyone started at the same time. With a program or arrangement with multiple songs, this synchronization, by pressing start, must occur at the same time, every time.

Finally, synchronization can be accomplished through radio. The big objection to radio is just that it is expensive. Everyone must have a specialized receiver and there must be specialized short range transmitting equipment. It costs a lot of money, but there are businesses that will bring out a quantity of receivers and host a dance party that way. Digital stream broadcasts, such as podcasts, are also very popular today. Multiple listeners may tune in to this broadcast to receive the same multimedia sample. However, such broadcasts lack the synchronized start time necessary for any synchronized movement by a group.

What is needed is a way to distribute precisely synchronized music to a group of people that does not disturb people outside of the group. The distribution needs to be simple and relatively inexpensive.

SUMMARY OF THE INVENTION

The present invention is a plurality of multimedia devices operating on a common time base having the ability to synchronize playback of a multimedia sample. A user initiates a synchronized playback by sending a request to one or more multimedia devices across a network. The user selects a multimedia sample and a start time. When the request is received by other multimedia devices on the network it can be accepted or denied. If the recipient accepts, the multimedia sample can be downloaded, cached, or streamed along with a specified time of play. Many can enjoy listening to the same multimedia sample even using headphones. This allows dancing to be enjoyed without requiring a sound system other than headphones.

In one exemplary embodiment, the present invention is a multimedia device which determines time from communication with a server. The multimedia device includes a processor, a memory in communication with the processor, a transceiver in communication with the processor, a multimedia logic on the memory, and a multimedia sample on the memory. The multimedia device communicates with a second multimedia device to start playback of the multimedia sample at the same time.

In another exemplary embodiment, the present invention is a system which plays a multimedia sample in synchronization. The system includes a plurality of multimedia devices, a time server in communication with the plurality of multimedia devices, and a multimedia sample on the plurality of multimedia devices. Synchronous playback of the multimedia sample occurs across the plurality of multimedia devices using a common time base acquired from the time server.

In a further exemplary embodiment, the present invention is a method of synchronized multimedia playback on a multimedia device. The method includes receiving a request for synchronized playback of a multimedia sample on the multimedia device, accepting the request for synchronized playback of the multimedia sample on the multimedia device, and playing the multimedia sample in synchronization with a second multimedia device playing an identical multimedia sample. Once the request is accepted, synchronized playback requires no user interaction.

In yet another exemplary embodiment, the present invention is a method of synchronized multimedia playback on a multimedia device. The method includes initiating a request for synchronized playback of a multimedia sample on a second multimedia device, and playing the multimedia sample in synchronization with the second multimedia device playing an identical multimedia sample. Once the request is accepted, synchronized playback requires no user interaction.

DETAILED DESCRIPTION OF THE INVENTION

Figure 1:
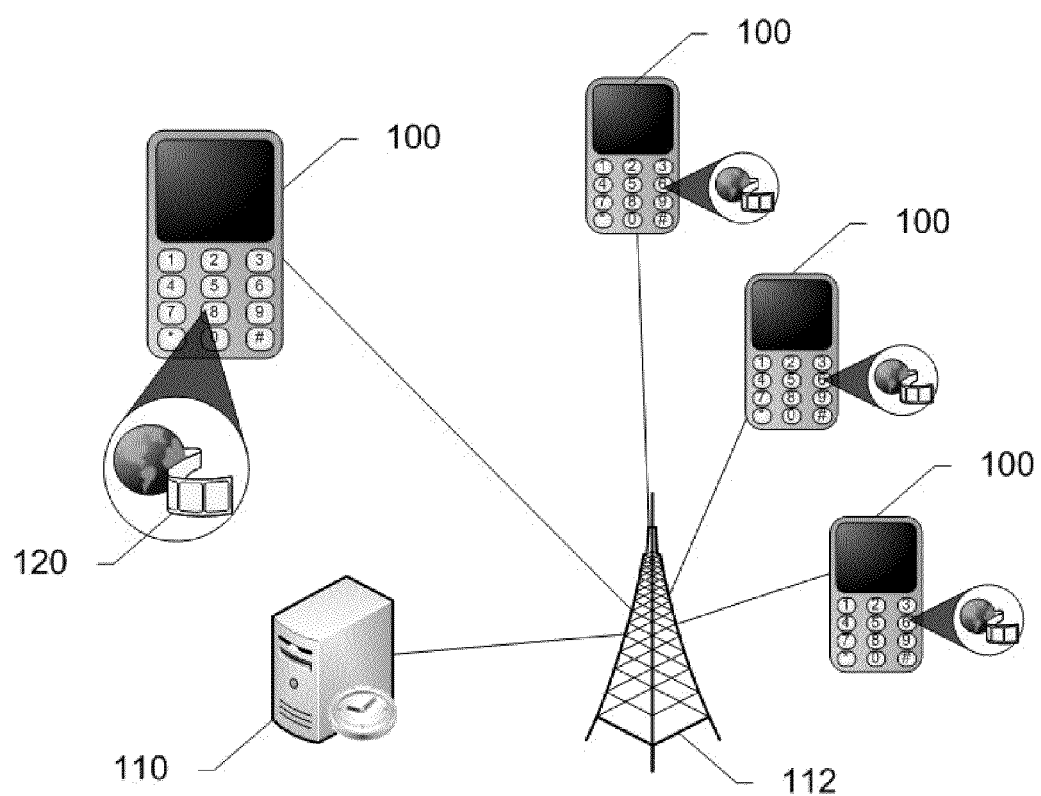
FIG. 1 shows a system for synchronizing the playback of a multimedia sample, according to an exemplary embodiment of the present invention.

The present invention is a plurality of multimedia devices operating on a common time base having the ability to synchronize playback of a multimedia sample. A user initiates a synchronized playback by sending a request to one or more multimedia devices across a network. The user selects a multimedia sample and a start time. When the request is received by other multimedia devices on the network it can be accepted or denied. If the recipient accepts, the multimedia sample can be downloaded or cached in advance of the time of play, or streamed during play. Many can enjoy listening to the same multimedia sample even using headphones. This allows dancing to be enjoyed without requiring a sound system other than headphones.

"Multimedia device," as used herein and throughout this disclosure, refers to a device capable of multimedia playback through at least one audible medium, and communicates with a network. Examples of a multimedia device include a cellular telephone that plays digital music, a digital music player that has at least one digital communication module, an IPOD, a ZUNE, etc.

"Multimedia sample," as used herein and throughout this disclosure, refers to a digital recording of audio, video, or both. Examples of a multimedia sample include a song in MOVING PICTURE EXPERTS GROUP AUDIO LAYER 3 (MP3) format, a movie in AUDIO VIDEO INTERLACE (AVI) format, etc. Multimedia samples do not need to be compressed but embodiments of the present invention may prefer compression.

"Cache," as used herein and throughout this disclosure, refers to the act of playing a multimedia sample while downloading the multimedia sample. An entire multimedia sample can be written or saved to a memory module during caching, but it is not necessary. If portions of a multimedia sample are written to a memory just before playback, then the playback is still said to be caching. Downloading requires the whole multimedia sample to be written or saved to memory before playback begins. Anything less is considered caching or streaming.

"Stream," as used herein and throughout this disclosure, refers to the act of playing a multimedia sample without downloading more than an amount of the multimedia sample which fills a buffer on a multimedia device. Streaming differs from caching in that streaming deletes portions of a multimedia sample that have already been played while caching saves the multimedia sample for later play. Though any multimedia device may stream a multimedia sample, some multimedia devices have a buffer much smaller than the size of an average multimedia sample, and therefore must stream certain multimedia samples.

The user who sends a multimedia synchronization request is referred to herein and throughout this disclosure as the "leader". Unlike a broadcast, a leader does not simply transmit a multimedia sample to be received on a certain channel or data stream. A leader merely selects a multimedia sample or playlist and associates it with a specific start time for the sample or playlist or with a list of specific start times for the elements of the playlist. Digital rights management (DRM) of multimedia samples differs in this case from broadcasts in that the leader does not need to hold the rights to broadcast each multimedia sample. The leader can rely on each recipient to have their own rights to each multimedia sample.

For the following description, it can be assumed that most correspondingly labeled structures across the figures (e.g., 132 and 232, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

The clock in a communications network is highly accurate, and can broadcast the time to multimedia and other devices via its wireless connection. By using this clock and starting at an agreed time, an arbitrarily large group of multimedia devices can play multimedia samples with time-synchronization precise enough for any synchronized movement. The agreed time may be set manually by each participant, or it may be set by an SMS, MMS, or other message to each participant's multimedia device. In the latter case, start times for several multimedia samples, comprising an entire playlist, can be distributed. While SMS can now be sent to address lists via PC software, Pocket PC telephone software, or bulk-SMS services, the proposed solution also includes software for the leader's multimedia devices that will facilitate sending a playlist (i.e., a list of multimedia samples and start times) to a group of recipients.

This feature can be included in multimedia devices at little cost because it is only software. Participants do not need special receivers, the event does not require a special transmitter, and synchronization is precise. A new audio selection, or list of selections, can be distributed to all the participants within seconds, so the leader can create or change the program in near real-time.

FIG. 1 shows a system for synchronizing the playback of a multimedia sample, according to an exemplary embodiment of the present invention. In this embodiment, the system includes a multimedia device 100, a multimedia sample 120 onboard multimedia device 100, a time server 110, and a broadcast antenna 112. Multimedia device 100 receives a playback request from another user. This playback request includes multimedia sample 120 to be played as well as the time to start multimedia sample 120. Multimedia device 100 may be a cellular telephone with multimedia playback capabilities or any other device which plays a form of multimedia and is capable of wireless communication. Multimedia device 100 maintains a time base by communicating with time server 110 through broadcast tower 112. Time server 110 periodically updates the time on multimedia device 100 to maintain a precise time on all multimedia devices using the system.

The time server uses a clock that is good to some small fraction of a second, such as an atomic or GPS clock. In other exemplary embodiments of the present invention, the request does not originate from a multimedia device, but instead from a desktop computer. An application actually running on the PC, via a network connection, sends the synchronized playback request to all of the multimedia devices. The application can be stored on the requestor's computer or stored on the network and accessible via a web browser. Some exemplary embodiments use a direct connection instead of a message service such as SMS. In these embodiments the requester uses a direct connection, such as an IP connection, to deliver the request to other multimedia devices. When selecting a start time for the multimedia sample, the requestor can set the time as an offset, such as sixty minutes from now.

In exemplary embodiments where the multimedia device is a cellular telephone, the time server is usually a cellular base station. Cellular base stations receive the time from an atomic clock somewhere on the network and are thus very accurate. Most cellular telephones have an operating system which allows custom programs in standard languages such as JAVA, etc. A program that can download and precisely start multimedia samples based upon the cellular base station time may be loaded onto many cellular telephones in use today.

The system can be used with many different types of multimedia devices. Each multimedia device needs to be able to communicate with a network in order to receive the time and download multimedia samples, and to playback multimedia samples.

Figures 2A, 2B:
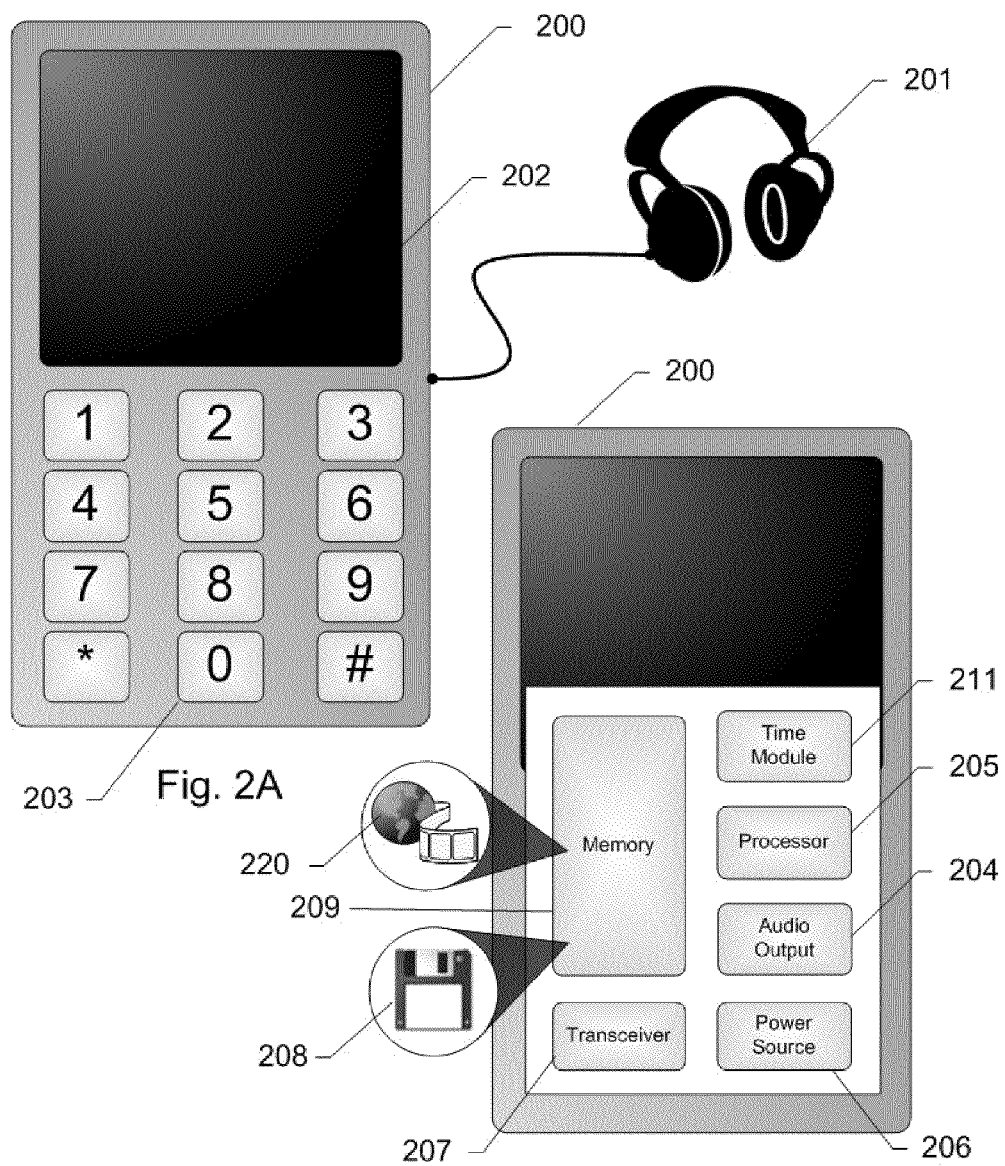
FIGS. 2A and 2B show a multimedia device, according to an exemplary embodiment of the present invention.

FIGS. 2A and 2B show a multimedia device 200, according to an exemplary embodiment of the present invention. In this embodiment, multimedia device 200 includes a listening device 201, a display 202, an input 203, an audio output module 204, a processor 205, a power source 206, a transceiver 207, a memory 209, a multimedia logic 208 onboard memory 209, a multimedia sample 220 onboard memory 209, and a time module 211. Listening device 201 allows a user to hear a multimedia sample played through multimedia device 200. Display 202 allows a user to view multimedia playback requests. Display 202 may be a liquid crystal display (LCD), light emitting diode (LED) display, etc. The user may select to accept a request using input 203. Input 203 may be a keypad, a scrolling device, a mouse, etc. Audio output module 204 transmits an analog audio signal to listening device 201. Processor 205 executes programs and logic stored on memory 209. Transceiver 207 communicates with a network. This network may be a cellular network, WiFi, BLUETOOTH, etc. Power source 206 provides power to each of the components of multimedia device 200. Multimedia logic 208 allows processor 205 to playback any compatible multimedia samples. Multimedia sample 220 uses multimedia logic 208 to play on multimedia device 200. Time module 211 maintains and updates the time on multimedia device 200.

In other exemplary embodiments, the multimedia device has a storage card or some other form of external memory. The multimedia device may have external speakers, attachable headphones, etc. for the playback of the multimedia sample. The multimedia device can use a touch screen as a form of input instead of or in addition to the other forms of input. The memory stores compressor/decompressors (codecs) which allow the multimedia device to playback compressed forms of audio and video such as MP3 and AVI. The multimedia device receives and installs new and updated codecs to play the most recent multimedia sample formats. New codecs may be sent over the network for installation or installed from an external memory source.

A user of a multimedia device on a network may receive a request for synchronized playback of a multimedia sample. In this event the multimedia device must evaluate whether or not the multimedia sample exists on the user's multimedia device, and if not then where to get it, before the synchronized playback begins.

Figure 3:
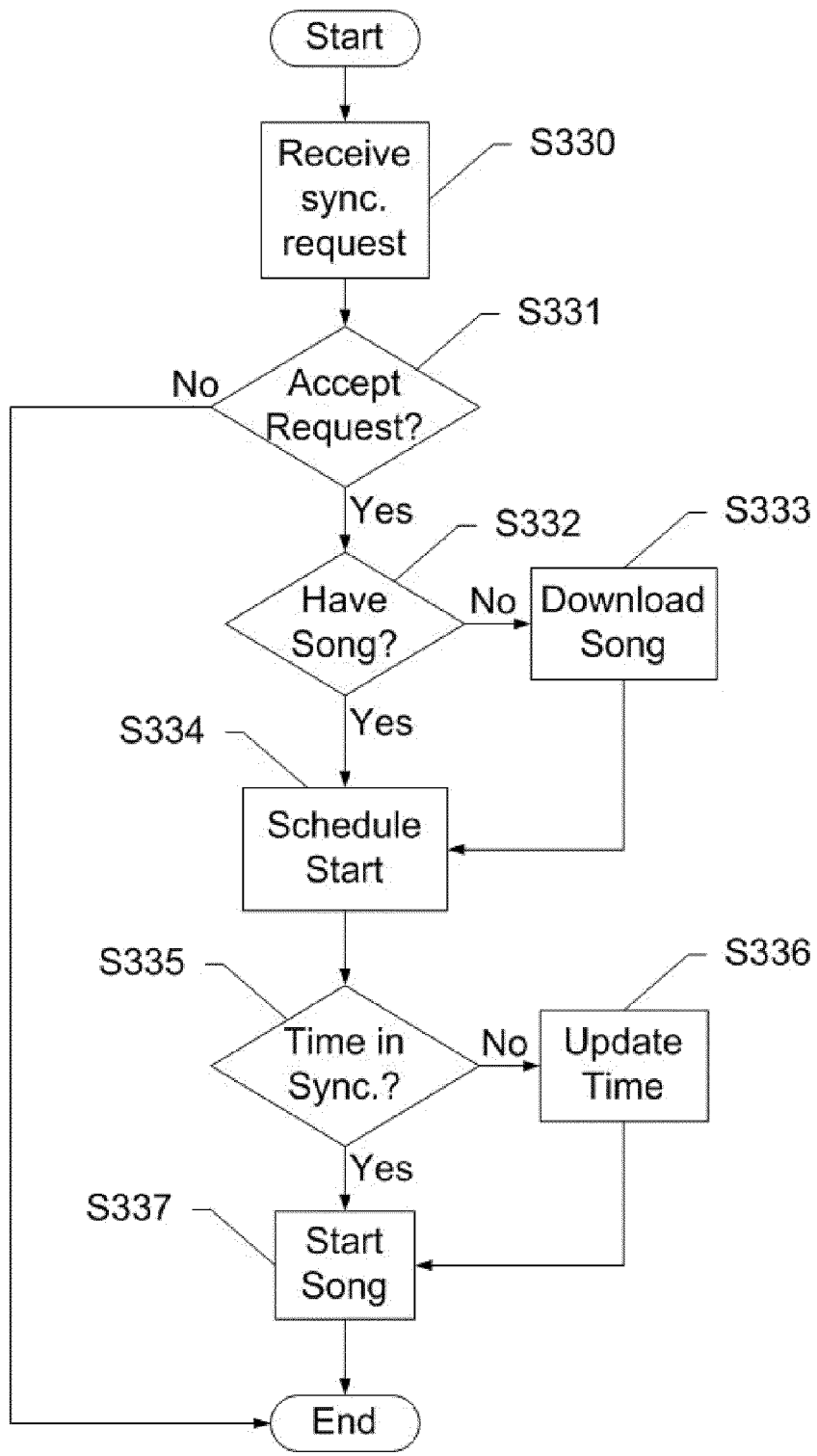
FIG. 3 shows a flowchart of the synchronized playback of a multimedia song, according to an exemplary embodiment of the present invention.

FIG. 3 shows a flowchart of the synchronized playback of a multimedia song, according to an exemplary embodiment of the present invention. In this embodiment, at the start of the process, a multimedia device receives a synchronization request S330. The request includes the name of a song as well as a requested start time. This request may come from another multimedia device, from a multimedia server, etc. Once the request is received, the user of the multimedia device is queried whether or not to accept the request S331. If the user chooses not to accept the request, the process ends. If the user accepts the request, the system determines whether or not the multimedia device already has the requested song stored on its memory S332. If the multimedia device does not have the song on its memory, the song is downloaded from a media server or another device S333. Once the multimedia device contains the song on its memory, either prior to the request or after downloading, logic on the multimedia device schedules the start time to play the song, based upon the time listed on the synchronization request S334. Either before or after the start time has been scheduled, the system queries whether the time on the multimedia device is synchronized with the time on a time server S335. This time server may be a cellular network time, a GPS clock, an atomic clock, etc. If the multimedia device is not already synchronized with the time server, the time on the multimedia device is updated S336. With the time on the device synchronized, the song starts at the scheduled time S337.

The multimedia sample can be a song, movie, television show, or any other form of pre-recorded multimedia. In other exemplary embodiments the multimedia sample does not need to be downloaded from a server prior to playback. In these embodiments the multimedia device can cache or stream the song from the server. The time gets set by default from the time server. A multimedia server on a network can stream or upload multimedia samples to many multimedia devices simultaneously.

Figure 4:
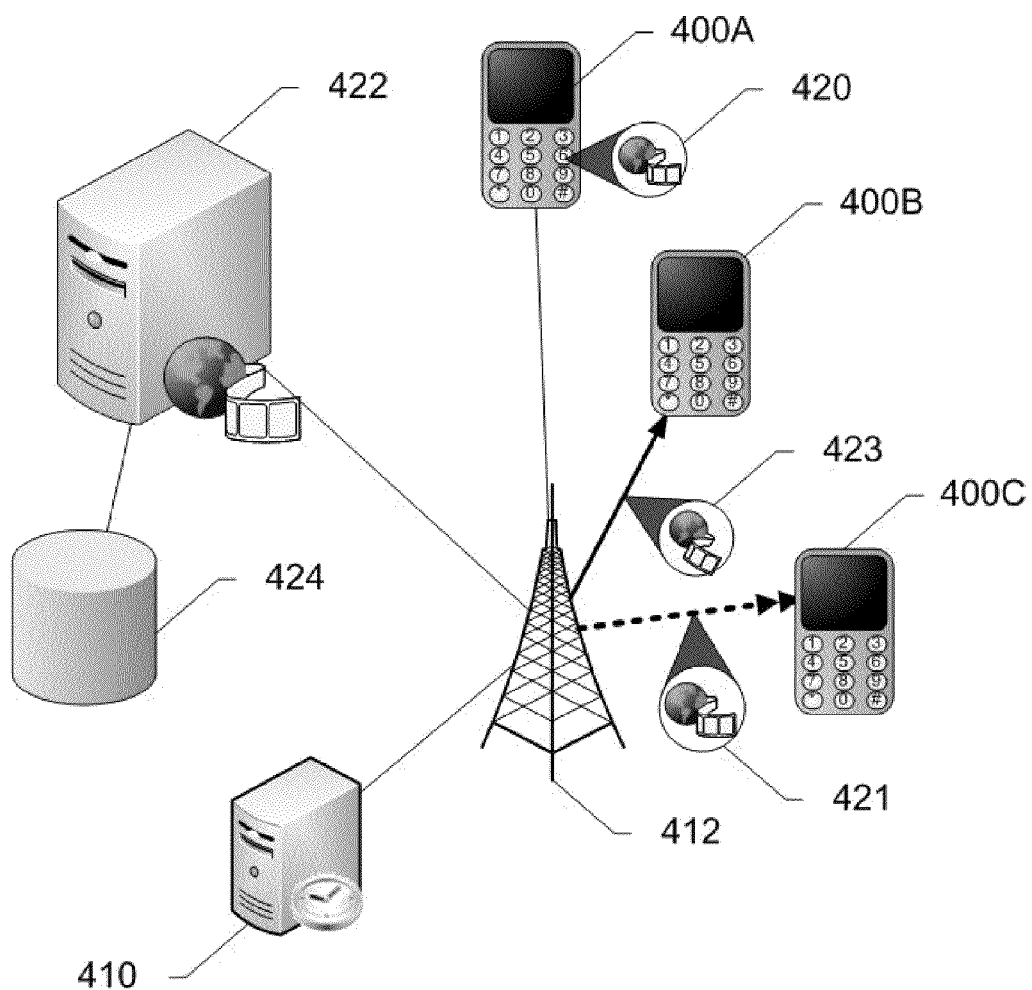
FIG. 4 shows a system including a multimedia server for synchronizing the playback of a multimedia sample, according to an exemplary embodiment of the present invention.

FIG. 4 shows a system including a multimedia server for synchronizing the playback of a multimedia sample, according to an exemplary embodiment of the present invention. In this embodiment, the system includes multimedia devices 400A, 400B, and 400C, a multimedia sample 420 onboard multimedia device 400A, a caching multimedia sample 423, a streaming multimedia sample 421, a time server 410, a multimedia server 422, a multimedia database 424, and a broadcast antenna 412. Multimedia devices 400A, 400B, and 400C receive a playback request from another user. This playback request includes multimedia sample 420 to be played as well as the time to start multimedia sample 420. Multimedia sample 420 is sent to multimedia device 400A from multimedia server 422. Multimedia database 424 stores a plurality of multimedia samples to be downloaded, cached, or streamed through multimedia server 422. At the set time, multimedia devices 400A and 400B play multimedia sample 420 in a synchronized manner. Since multimedia device 400B does not have the whole multimedia sample downloaded, multimedia device 400B is said to be caching. Multimedia device 400C streams multimedia sample 421 instead of downloading multimedia sample 420. Streaming multimedia sample 421 requires multimedia device 400C to contain a buffer in its memory to maintain a steady playback. In order to stream in synchronization, multimedia device 400C must begin the stream an amount of time earlier than the set start time equal to multimedia device 400C's buffer size in milliseconds. This allows the buffer to fill before beginning playback. Multimedia devices 400A, 400B, and 400C maintain a time base by communicating with time server 410 through broadcast tower 412. Time server 410 periodically updates the time on multimedia device 400A, 400B, and 400C to maintain a precise time on all multimedia devices using the system.

In other exemplary embodiments a multimedia sample can be streamed to a multimedia device directly from another multimedia device. This stream may require a network with more bandwidth, especially in the case where many multimedia devices stream a multimedia sample from one other multimedia device. In exemplary embodiments featuring cellular telephones as multimedia devices, the multimedia sample is streamed over the data channel or whatever mechanism the cellular provider is using for streaming music. When streaming, in order to ensure synchronization, the multimedia device needs to know the buffer size in milliseconds so it may begin streaming in such a way that playback is synchronized. Though a buffer size in bytes is constant, the buffer size will vary in milliseconds with a bit-rate of a multimedia sample. The bit-rate of a multimedia sample is expressed as an amount of kilobits per second, such as 128 kbps. In order to compute the buffer size in milliseconds this formula is applied:

$$B_{ms} = \frac{B_{kb}}{R_{kbps}} \times 1000$$

Where $B_{ms}$ is the buffer size in milliseconds, $B_{kb}$ is the buffer size in kilobits, and $R_{kbps}$ is the bit-rate of the multimedia sample. The multimedia device performs this calculation before implementing a start time for the stream.

Figure 5A:
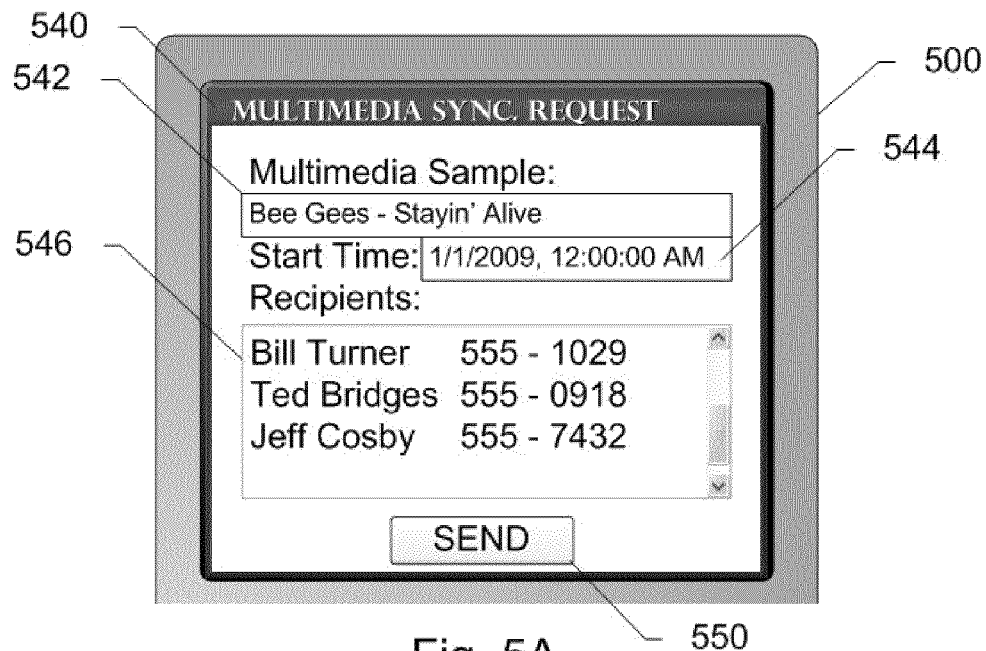
FIGS. 5A and 5B show examples of a request and acceptance screen for a synchronized playlist, according to an exemplary embodiment of the present invention.
Figure 5B:
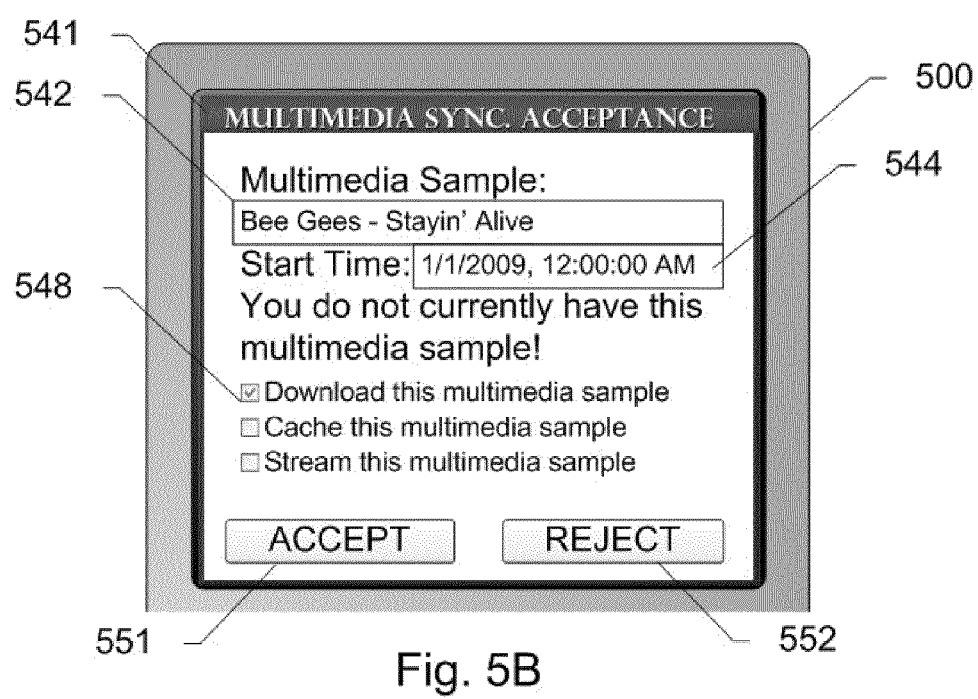

In addition to software that allows a multimedia device to playback a multimedia sample at a specified time, the multimedia device has software enabling a user to initiate a synchronized playback request as well as accept or deny such a request. FIGS. 5A and 5B show examples of a request and acceptance screen for a synchronized playlist, according to an exemplary embodiment of the present invention. These screens allow a user to create a request to send to other users or accept a request from another user.

FIG. 5A shows a multimedia synchronization request screen 540 on a multimedia device 500, according to an exemplary embodiment of the present invention. In this embodiment, request screen 540 includes a multimedia sample name 542, a start time 544, and recipients 546. A user opens the request screen on multimedia device 500. The user selects multimedia sample 542 which the user wishes to listen to in synchronization with others. Multimedia sample 542 may be selected from the memory of multimedia device 500, from an external multimedia server, etc. The user selects start time 544 for the playback. This may include the day, month, year, and time as well as the time zone start time 544 is based upon. The user also selects recipients 546 of multimedia synchronization request 540. This allows the user to select which contacts with which he wishes to listen to the synchronized multimedia sample 542.

The multimedia sample can be a single sample or a whole playlist of samples. In some exemplary embodiments each multimedia sample in a playlist is associated with its own start time to maintain synchronization. A location can be included in the multimedia synchronization request so that invitees can gather in the same place to listen to the multimedia sample or playlist.

Once a multimedia synchronization request is completed and sent out, the contacts marked as recipients will receive the request. Once the request is received, the recipients are then given the choice whether or not to accept the request.

FIG. 5B shows a multimedia synchronization acceptance screen 541 on a multimedia device 500, according to an exemplary embodiment of the present invention. In this embodiment, acceptance screen 541 includes a multimedia sample 542, a start time 544, a multimedia sample delivery preference 548, an accept button 551, and a reject button 552. When a user receives a multimedia synchronization request, multimedia device 500 displays acceptance screen 541. The user is shown a song or other media requested in multimedia sample 542. The user is shown the time the synchronized multimedia is to start in start time 544. Because the user does not currently have the desired multimedia sample, the user must select whether to download, cache, or stream the multimedia sample by checking a box in multimedia sample delivery preference 548. In alternative embodiments, the user may select a file type preference by scrolling down, highlighting, etc. With multimedia sample delivery preference 548 selected, the user either accepts or rejects the multimedia synchronization request using accept button 551 to accept or reject button 552 to reject.

When responding to multimedia synchronization requests having a playlist of multimedia samples, a user may find some of the multimedia samples exist on their multimedia device while some do not. For this reason, exemplary embodiments of the acceptance screen allow the user to specify a multimedia sample delivery preference for each multimedia sample not currently on their multimedia device. Some multimedia samples may be downloaded or cached ahead of the start time while others may be streamed during playback. Some multimedia devices may not have enough memory to hold an entire playlist. In these embodiments a user needs to select some multimedia samples for streaming and others for prior downloading.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A multimedia device, comprising:
   a processor; and
   a memory in communication with the processor, the memory storing a logic which, when executed by the processor, enables the processor to perform operations comprising:
      receiving a synchronization request from a second multimedia device having a multimedia sample, the synchronization request comprising a playlist of a plurality of multimedia samples, the playlist comprising a name of each multimedia sample and a requested time to start a playback of each multimedia sample simultaneously;
      determining an availability on the memory for each multimedia sample named in the playlist;
      receiving a delivery preference for any multimedia sample that is not available on the memory, the delivery preference comprising one of a first selection to download said any multimedia sample and a second selection to stream said any multimedia sample; and
      scheduling a start time for the playback based on the requested time upon determining that a time of the multimedia device is synchronized with a time of a time server, the time server being at least one of a cellular network time, a global positioning system (GPS) clock, or an atomic clock.

2. The multimedia device in claim 1, wherein the multimedia device is a cellular telephone capable of performing the playback.

3. The multimedia device in claim 1, further comprising a transceiver in communication with the processor.

4. The multimedia device in claim 1, wherein the multimedia sample is a song.

5. The multimedia device in claim 1, further comprising a pair of headphones in communication with the processor.

6. The multimedia device in claim 1, wherein the operations further comprise accepting or denying the synchronization request.

7. A system, comprising:
   a first multimedia device comprising a processor and a memory storing a multimedia sample; and
   a second multimedia device for transmitting to the first multimedia device a synchronization request for a playback of the multimedia sample;
   wherein the memory of the first multimedia device further stores a logic that is executed by the processor to perform operations comprising:
      in response to the synchronization request, the synchronization request comprising a playlist of a plurality of multimedia samples, the playlist comprising a name of each multimedia sample and a requested time to start a playback of each multimedia sample simultaneously, determining an availability on the memory for each multimedia sample named in the playlist;
      receiving a delivery preference for any multimedia sample that is not available on the memory, the delivery preference comprising one of a first selection to download said any multimedia sample and a second selection to stream said any multimedia sample; and
      synchronizing a time of the first multimedia device with a time of a time server prior to scheduling a start time for the playback based on the requested time, the synchronization being achieved through receiving periodic updates from the time server, the time server being at least one of a cellular network time, a global positioning system (GPS) clock, or an atomic clock.

8. The system in claim 7, wherein the first multimedia device is a cellular telephone capable of performing the playback.

9. The system in claim 7, further comprising a multimedia server in communication with the first multimedia device.

10. The system in claim 9, wherein the multimedia server sends the multimedia sample to the first multimedia device.

11. The system in claim 9, further comprising a multimedia database having a plurality of multimedia samples, the multimedia database being in communication with the multimedia server.

12. A method, comprising:
   querying, by a first multimedia device comprising a processor, an availability of a multimedia sample on the first multimedia device upon receiving a synchronization request at the first multimedia device from a second multimedia device having the multimedia sample, the synchronization request comprising a playlist of a plurality of multimedia samples, the playlist comprising a name of each multimedia sample and a requested time to start a playback of each multimedia sample simultaneously;
   determining an availability on the memory for each multimedia sample named in the playlist;
   receiving a delivery preference for any multimedia sample that is not available on the memory, the delivery preference comprising one of a first selection to download said any multimedia sample and a second selection to stream said any multimedia sample; and
   scheduling a start time for the playback based on the requested time using the logic upon determining that a time of the first multimedia device is synchronized with a time on a time server, the time server being at least one of a cellular network time, a global positioning system (GPS) clock, or an atomic clock.

13. The method in claim 12, wherein the multimedia sample is acquired.

14. The method in claim 13, wherein the acquisition is at least one of a downloading of the multimedia sample, a caching of the multimedia sample, or a streaming of the multimedia sample.

15. The method in claim 12, further comprising receiving a location of the playback.

16. A method, comprising:
   in response to receiving, from a requesting multimedia device, a synchronization request comprising a playlist of a plurality of multimedia samples, the playlist comprising a name of each multimedia sample and a requested time to start a playback of each multimedia sample simultaneously, scheduling, at a receiving multimedia device comprising a processor, a start time for a playback of a multimedia sample upon determining that a time of the receiving multimedia device is synchronized with a time on a time server, the time server being at least one of a cellular network time, a global positioning system (GPS) clock, or an atomic clock;
   determining an availability on the memory for each multimedia sample named in the playlist;
   receiving a delivery preference for any multimedia sample that is not available on the memory, the delivery preference comprising one of a first selection to download said any multimedia sample and a second selection to stream said any multimedia sample; and
   initiating the playback of the multimedia sample on the receiving multimedia device at the scheduled start time, the playback being synchronized with a playback of the multimedia sample on the requesting multimedia device.

17. The method in claim 16, wherein the multimedia sample is acquired.

18. The method in claim 17, wherein the acquisition is at least one of a downloading of the multimedia sample, a caching of the multimedia sample, or a streaming of the multimedia sample.

19. The method in claim 16, further comprising selecting a location of the playback.

20. The multimedia device in claim 1, wherein the multimedia device is a digital music player having at least one digital communication module.

21. The multimedia device in claim 1, wherein the multimedia sample is a movie in an audio video interface format.

22. The method of claim 12, wherein the first multimedia device is a cellular telephone.

23. The method of claim 12, wherein the first multimedia device is a digital music player having at least one digital communication module.

24. The method of claim 16, wherein the synchronization request is sent to the receiving multimedia device via a short message service center.

* * * * *